US010252686B2

(12) United States Patent
Freundl et al.

(10) Patent No.: US 10,252,686 B2
(45) Date of Patent: Apr. 9, 2019

(54) LIGHTWEIGHT EXTRUDED ALUMINUM BUMPER

(71) Applicant: MAGNA INTERNATIONAL INC., Aurora (CA)

(72) Inventors: Thomas James Freundl, Clarkston, MI (US); Jeffery Jay Mellis, Bloomfield Hills, MI (US)

(73) Assignee: MAGNA INTERNATIONAL INC., Aurora, Ontario (CA)

(*) Notice: Subject to any disclaimer, the term of this patent is extended or adjusted under 35 U.S.C. 154(b) by 0 days.

(21) Appl. No.: 15/328,011

(22) PCT Filed: Jul. 30, 2015

(86) PCT No.: PCT/US2015/042828
§ 371 (c)(1),
(2) Date: Jan. 20, 2017

(87) PCT Pub. No.: WO2016/019107
PCT Pub. Date: Feb. 4, 2016

(65) Prior Publication Data
US 2017/0166148 A1 Jun. 15, 2017

Related U.S. Application Data

(60) Provisional application No. 62/031,335, filed on Jul. 31, 2014.

(51) Int. Cl.
*B60R 19/18* (2006.01)
*B60R 19/34* (2006.01)
(Continued)

(52) U.S. Cl.
CPC .............. *B60R 19/18* (2013.01); *B21C 23/14* (2013.01); *B21D 53/88* (2013.01); *B60R 19/34* (2013.01); *B60R 2019/182* (2013.01)

(58) Field of Classification Search
CPC ......... B60R 19/18; B60R 19/34; B21D 53/88; B21C 23/14
(Continued)

(56) References Cited

U.S. PATENT DOCUMENTS 6,003,930 A 12/1999 Frank et al.
7,357,432 B2 4/2008 Roll et al.
(Continued)

OTHER PUBLICATIONS

International Preliminary Report on Patentability dated Feb. 9, 2017 in corresponding International Patent Application No. PCT/US2015/042828.
(Continued)

*Primary Examiner* — Joseph D. Pape
(74) *Attorney, Agent, or Firm* — Pillsbury Winthrop Shaw Pittman LLP

(57) ABSTRACT

A longitudinally extending extruded aluminum bumper is constructed and used in a bumper assembly to protect a vehicle from impact. The bumper includes a three wall design, formed by an integrally formed top wall and a bottom wall interconnected by a front vertically extending wall. The top and bottom walls have open ends that are spaced relative to one another to form a longitudinally extending, open-ended channel therebetween. Upwardly extending and downwardly extending flanges are integrally formed with front vertically extending wall and the top and bottom walls of the bumper. The extruded bumper can be attached directly to an end of a vehicle. Impact absorption devices can also be inserted into the longitudinally extending channel of the bumper and abut against the front vertical wall. Welds can be provided in a non-planar manner to connect the impact absorption devices to the bumper.

40 Claims, 10 Drawing Sheets

(51) Int. Cl.
*B21C 23/14* (2006.01)
*B21D 53/88* (2006.01)

(58) Field of Classification Search
USPC .................................................. 293/102, 120
See application file for complete search history.

(56) References Cited

U.S. PATENT DOCUMENTS

| | | |
|---|---|---|
| 8,276,954 B2 | 10/2012 | Handing et al. |
| 8,919,834 B2 * | 12/2014 | Freundl .................. B60R 19/18 293/133 |
| 2011/0285152 A1 | 11/2011 | Kwon et al. |
| 2016/0144812 A1 * | 5/2016 | Kaneko .................. B60R 19/18 293/102 |
| 2016/0167609 A1 * | 6/2016 | Corwin .................. B60R 19/03 293/120 |

OTHER PUBLICATIONS

International Search Report dated Oct. 30, 2015 in corresponding International Patent Application No. PCT/US2015/042828.

* cited by examiner

LIGHTWEIGHT EXTRUDED ALUMINUM BUMPER

CROSS-REFERENCE TO RELATED APPLICATION

This application is the U.S. national phase entry of PCT patent application no. PCT/US2015/042828, which claims the benefit of priority of U.S. provisional application No. 62/031,335, which was filed on Jul. 31, 2014, and which is incorporated herein in its entirety by reference.

BACKGROUND

Field

The present disclosure is generally related to a bumper and a bumper assembly for a vehicle.

Description of Related Art

Conventional bumpers are typically formed from steel or aluminum. Steel bumpers decrease the cost of manufacturing, but increase the mass and weight of the bumper itself. On the other hand, aluminum reduces bumper assembly weights, but may have higher raw material costs.

SUMMARY

This disclosure introduces a new, open section design for a bumper that is extruded from aluminum, to reduce overall bumper mass and costs for materials.

It is an aspect of this disclosure to provide a bumper for a vehicle. The bumper includes a longitudinally extending extruded aluminum bumper body constructed to protect the vehicle from impact. The bumper body has an integrally formed top wall and a bottom wall interconnected at each of their first ends by a front vertically extending wall. The top and bottom walls further have second ends that are spaced relative to one another to form a longitudinally extending, open-ended channel between the top and bottom walls. The bumper body also includes an integrally formed upwardly extending flange and an integrally formed downwardly extending flange. The upwardly extending flange extends vertically from the front vertically extending wall in an upward direction relative to the top wall. The downwardly extending flange extends vertically from the front vertically extending wall in a downward direction relative to the bottom wall. The flanges are integrally formed with front vertically extending wall and the top and bottom walls.

Another aspect provides a bumper assembly for a vehicle. The bumper assembly includes a longitudinally extending extruded aluminum bumper constructed to protect the vehicle from impact. The bumper has an integrally formed top wall and a bottom wall interconnected at each of their first ends by a front vertically extending wall. The top and bottom walls further have second ends that are spaced relative to one another to form a longitudinally extending, open-ended channel between the top and bottom walls. The bumper body also includes an integrally formed upwardly extending flange and an integrally formed downwardly extending flange. The upwardly extending flange extends vertically from the front vertically extending wall in an upward direction relative to the top wall. The downwardly extending flange extends vertically from the front vertically extending wall in a downward direction relative to the bottom wall. The flanges are integrally formed with front vertically extending wall and the top and bottom walls. Also included in the assembly are at least a first and a second impact absorption device. Each of the first and second impact absorption devices has a first end configured to be attached to an end of the vehicle and a second end attached to the longitudinally extending extruded aluminum bumper. The second ends of the at least first and second impact absorption devices are inserted into the longitudinally extending channel and attached to the front vertical wall of the longitudinally extending extruded aluminum bumper.

Yet another aspect provides a method of manufacturing a bumper for a vehicle. The method includes: extruding a longitudinally extending aluminum bumper body constructed to protect the vehicle from impact, the bumper body comprising: an integrally formed top wall and a bottom wall interconnected at each of their first ends by a front vertically extending wall, the top and bottom walls further having second ends that are spaced relative to one another to form a longitudinally extending, open-ended channel between the top and bottom walls; an integrally formed upwardly extending flange extending vertically from the front vertically extending wall in an upward direction relative to the top wall; and an integrally formed downwardly extending flange extending vertically from the front vertically extending wall in a downward direction relative to the bottom wall.

Still yet another aspect provides a method of forming a bumper assembly for a vehicle. The method includes: extruding a longitudinally extending aluminum bumper constructed to protect the vehicle from impact, the bumper comprising an integrally formed top wall and a bottom wall interconnected at each of their first ends by a front vertically extending wall, the top and bottom walls further having second ends that are spaced relative to one another to form a longitudinally extending, open-ended channel between the top and bottom walls, an upwardly extending flange extending vertically from the front vertically extending wall in an upward direction relative to the top wall, and a downwardly extending flange extending vertically from the front vertically extending wall in a downward direction relative to the bottom wall, the upwardly extending and downwardly extending flanges of the bumper being integrally formed with front vertically extending wall and the top and bottom walls; providing at least a first and second impact absorption device, each impact absorption device comprising a first end and a second end; inserting the second ends of the at least first and second impact absorption devices into the longitudinally extending channel of the extruded longitudinally extending aluminum bumper; and attaching each of the at least first and second impact absorption devices to the extruded longitudinally extending aluminum bumper.

Other features and advantages of the present disclosure will become apparent from the following detailed description, the accompanying drawings, and the appended claims.

DETAILED DESCRIPTION OF THE PREFERRED EMBODIMENT(S)

Figure 1:
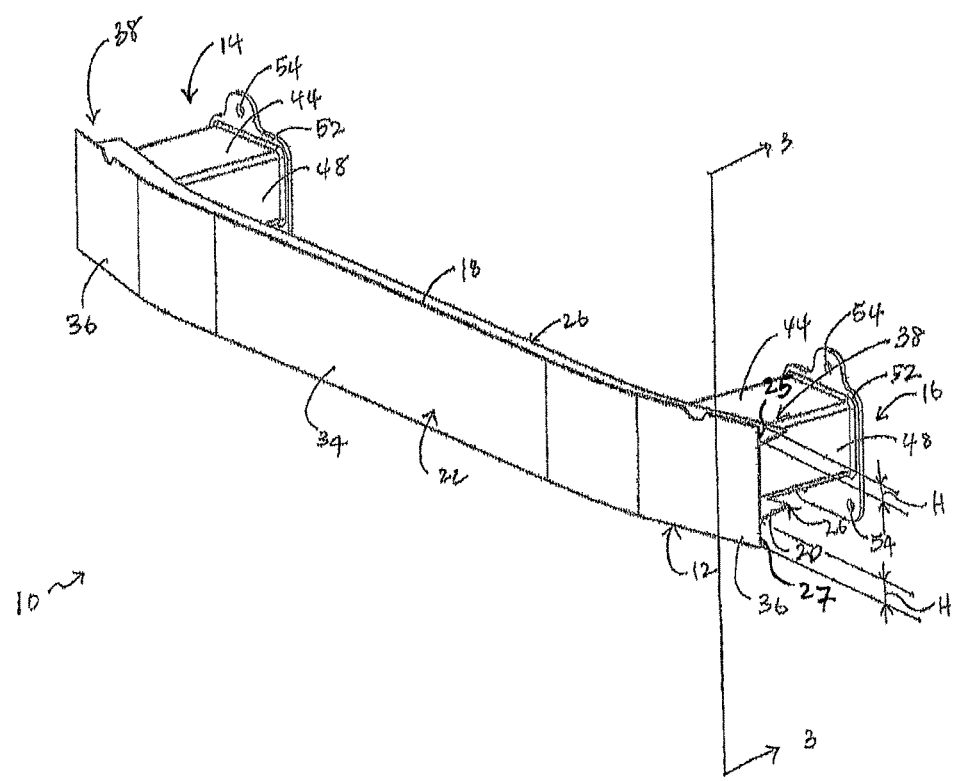
FIG. 1 is a perspective view of a bumper assembly in accordance with an embodiment of the present disclosure.
Figure 2:
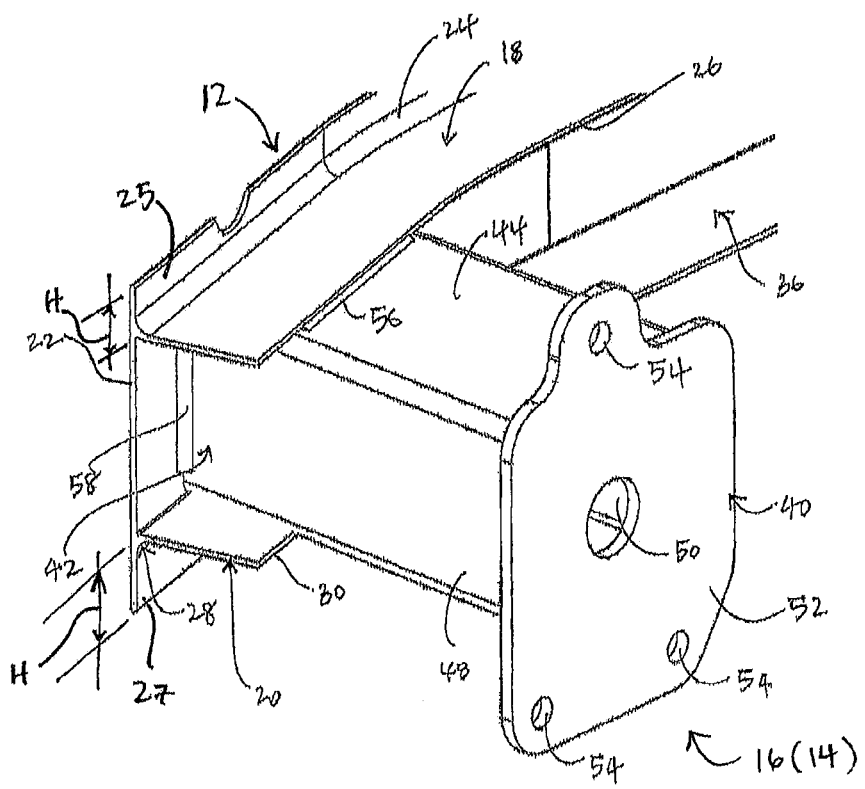
FIG. 2 is an end perspective view of an end of the bumper assembly of FIG. 1.
Figure 5:
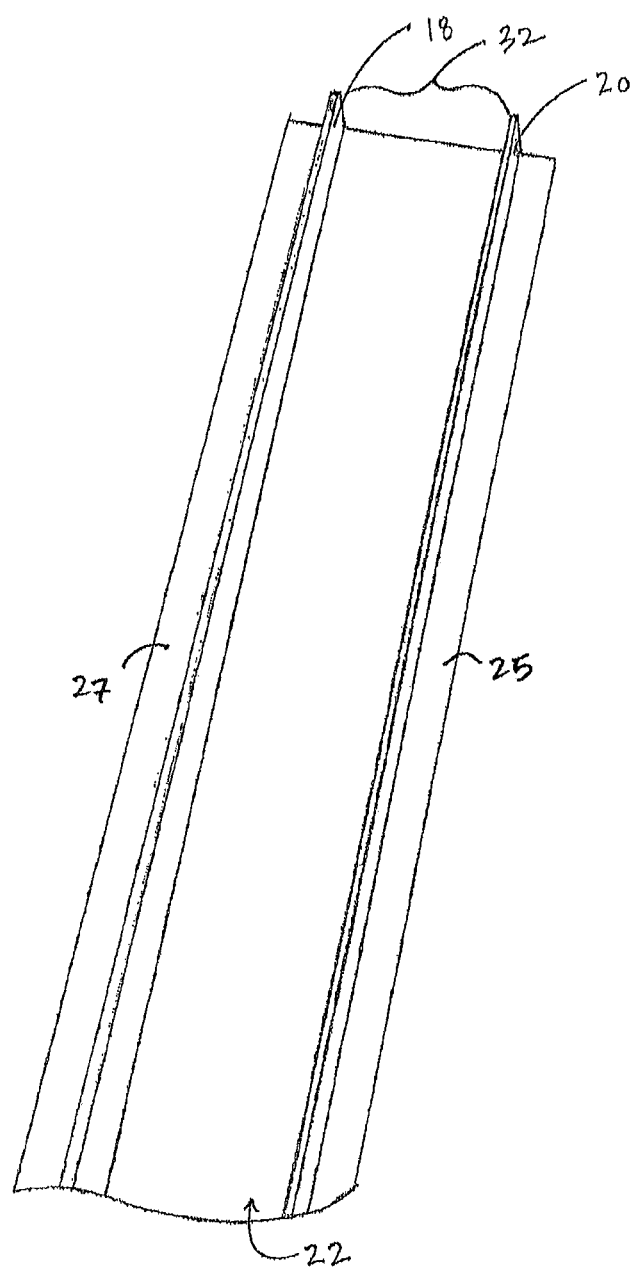
FIGS. 5 and 6 are an end perspective and end views, respectively, of a bumper used in the bumper assembly of FIG. 1.
Figure 6:
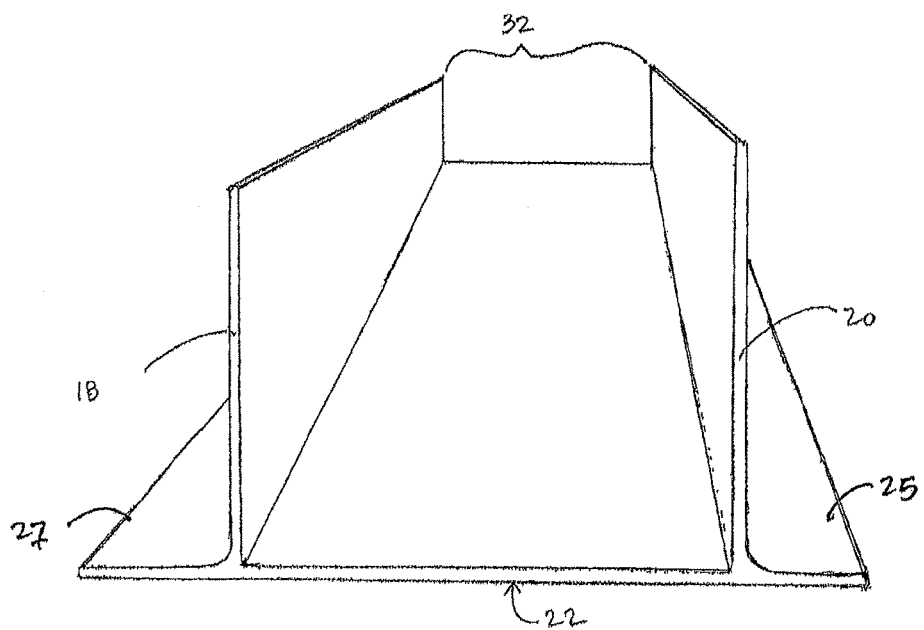

Referring now more particularly to the drawings, FIG. 1 shows a perspective view of a bumper assembly 10 for use with a vehicle (see FIG. 3) in accordance with an embodiment of the present disclosure. The bumper assembly 10 includes a longitudinally extending extruded aluminum bumper 12 having a body constructed to protect the vehicle from impact, e.g., when another object or vehicle collides with the bumper or vehicle. The body of the bumper 12 includes an integrally formed top wall 18 and a bottom wall 20, as well as an integrally formed upwardly extending flange 25 and an integrally formed downwardly extending flange 27. The top wall 18 includes a first end 24 (see FIG. 2) and a second end 26. The bottom wall 20 includes a first end 28 (see FIG. 2) and a second end 30. The top and bottom walls 18, 20 are interconnected at each of their first ends 24, 28 (respectively) by a front vertically extending wall 22, since the bumper 12 is extruded. The second ends 26, 30 of the top and bottom walls 18, 20 are spaced relative to one another to form a longitudinally extending, open-ended channel 32 between the top and bottom walls 18, 20. For example, as seen in FIG. 5 and FIG. 6, the channel 32 extends between the two walls 18, 20 and vertically extending wall 22. The top and bottom walls 18, 20 are substantially parallel to each other, so as to form a "C"-shaped section, with the vertically extending wall 22, of the bumper 12.

Each of the walls can be flat or not flat. In an embodiment, one or more walls 18, 20, and/or 22 can be slightly bent or curved or angled. For example, in an embodiment, at least the front vertically extending wall 22 is curved or bent to permit deflection of a center portion of the bumper body in the event of impact or collision. This can provide a small sweep such that impact can reach and be transferred to the vehicle body and/or any impact absorption device attached to the bumper 12. For example, in one embodiment, the front vertically extending wall 22 includes a central portion 34 and end portions 36. For example, after extruding the walls 18, 20, and 22 of the bumper 12, the extruded longitudinally extending aluminum bumper body can be bent by applying pressure to end portions 36 or sections of the bumper 12 to move the end portions 36 towards each other and bend the structure to form curved end sections 38 in the body of the bumper 12.

An intermediate curved portion may or may not be included in the bumper 12, according to an embodiment. For example, the central portion 34 of the bumper 12 can have a formed intermediate portion that is curved during or after manufacturing, and provided between end portions 36.

As shown in the Figures, the front vertically extending wall 22 can extend above or below the top wall 18 and/or bottom wall 20 at a height H. More specifically, an upwardly extending flange 25 and downwardly extending flange 27 are formed to extend vertically from each end of the front vertically extending wall 22, outwardly relative to the top and bottom walls 18, 20 (e.g., see FIGS. 2, 3, and 6). The upwardly extending flange 25 extends vertically from the front vertically extending wall 22 in an upward direction relative to the top wall 18, and the downwardly extending flange 27 extends vertically from the front vertically extending wall 22 in a downward direction relative to the bottom wall 20, when the bumper 12 is attached or mounted to the vehicle. In an embodiment, the flanges 25 and 27 extend in a direction that is relatively and substantially perpendicular to the top and bottom walls 18, 20. The upwardly extending flange 25 and the downwardly extending flange 27 are integrally formed with the front vertically extending wall 22 and top and bottom walls 18 and 20 during manufacturing (i.e., during the extrusion process), as noted further below. The extension of the bumper face or flanges above and/or below the horizontal walls is provided to meet engagement of impact barriers, for example. Such impact barriers are used during the testing evaluation of the vehicles, for example.

In one embodiment, the bumper 12 is attached to an end 13 of the vehicle via an energy absorbing device (e.g., see FIG. 3) or devices, forming a bumper assembly 10. For example, at least a first and second impact absorption device 14, 16, respectively, can be provided between the bumper 12 and the end, face, surface, structure, or frame of the vehicle. In one embodiment, the bumper 12 is part of a bumper assembly 10 mounted to the front end of a frame at the front end of the vehicle via the impact absorption devices 14, 16. In one embodiment, the bumper 12 is mounted to the back end of a frame at the back end of the vehicle via the impact absorption devices 14, 16. For example, an end (e.g., first end 40) of the impact absorption devices 14, 16 can be mounted to a frame at the end 13 of the vehicle, while an opposite end is attached to the bumper 12, as described below. The impact absorption devices 14 and 16 can be used to maintain planar alignment of the bumper 12 with the item, e.g., a rail of a vehicle or car, it is attached to.

Each of the first and second impact absorption devices 14 and 16 can have a first end 40 configured to be attached and/or attached to an end of the vehicle and a second end 42 configured to be attached and/or attached to the longitudinally extending extruded aluminum bumper 12. The second ends 42 of the at least first and second impact absorption devices 14, 16 are inserted into the longitudinally extending channel 32 and attached to the front vertical wall 22 of the longitudinally extending extruded aluminum bumper 12.

Figure 3:
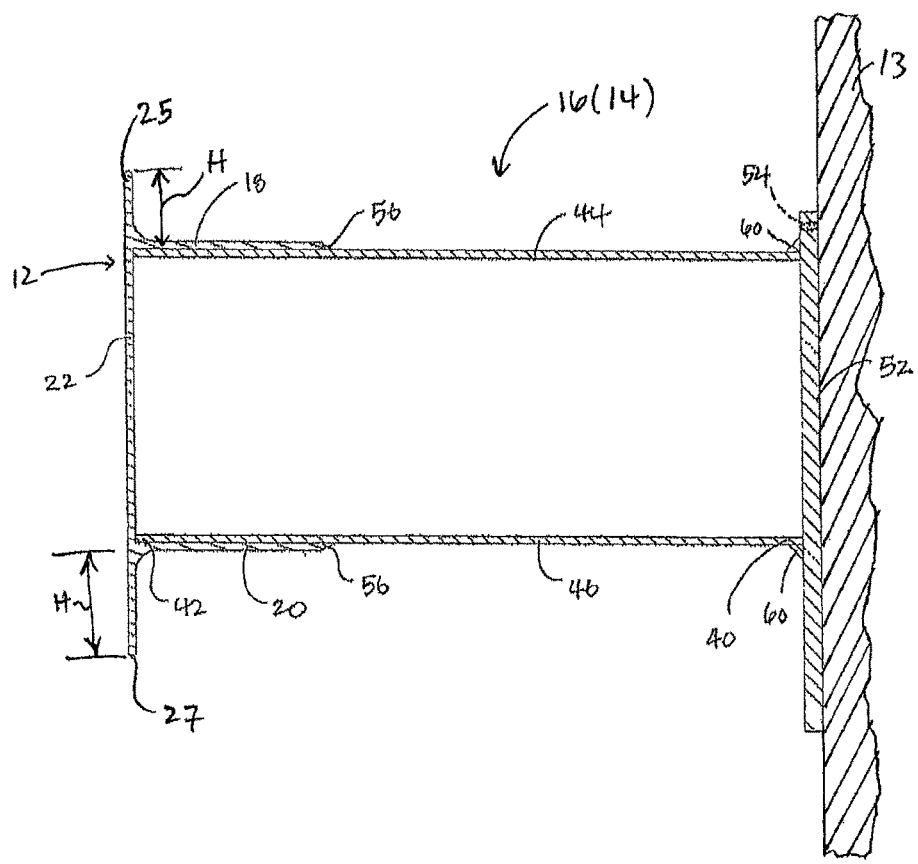
FIG. 3 is a sectional view of parts of the bumper assembly of FIG. 1 taken along line 3-3 and attached to an end of a vehicle in accordance with an embodiment.

As represented by the cross-section as shown in FIG. 3, in accordance with one non-limiting embodiment, a front face of each of the second ends 42 of each of the at least first and second impact absorption devices 14, 16 abuts the inside surface of the front vertical wall 22. Abutting the impact absorption device 14, 16 and then attaching the bumper 12 against their faces, however, is one example of forming the bumper assembly 10. In an embodiment, one or more spaces or gaps may be provided between one or more of: an inside face of the bumper 12 and the rail, an inside face of the front vertical wall 22 and each of the impact absorption devices 14, 16 or crush cans, the bumper 12 and brackets, and the like.

More specifically, in an embodiment, each of the at least first and second impact absorption devices 14, 16 is a tubular body member. In one embodiment, each of the at least first and second impact absorption devices 14, 16 has a substantially box shaped body portion comprising an upper wall 44, a lower wall 46, a right side wall 48, and a left side wall 50. In one embodiment, each of the at least first and second impact absorption devices 14, 16 are hollow. In an embodiment, the first and second impact absorption devices 14, 16 are collapsible. In an embodiment, one or more of the walls 44-50 are collapsible walls. In an embodiment, the upper walls 44 and lower walls 50 of each of the at least first and second impact absorption devices 14, 16 abut the top and bottom walls 18, 20 of the bumper 12 and are configured for collapsing upon application of a predetermined force.

However, the type of impact absorption member need not be limited to the illustrated design. For example, can include a telescopic or accordion-like portion within its body that is designed to bend or collapse in a predetermined manner upon application of force. The absorption member(s) or crush can(s) that may be used with the herein disclosed bumper design can include partially solid or solid bodies, and not need be completely hollow, as previously noted. Also, if crush cans are used with the disclosed bumper 12, they may or may not be tubular, and may or may not be rectangular. The illustrated design of the impact absorption members 14, 16 as shown in the Figures and is not intended to be limited. One of ordinary skill in the art understands that there are many different types of crush cans/impact absorption devices and other ways to mount a bumper and/or cans to a vehicle.

Each impact absorption device 14, 16 can include an optional flange 52 at its first end 40 (i.e., the end that is opposite the end (second end 42) used for attachment to the bumper 12). The flanges 52 can include one or more openings 54 for acceptance of attachment devices, such as bolts, to attach the impact absorption device 14, 16 to the vehicle (e.g., to a rail, structure, or surface at the end of the vehicle). In an embodiment, attachment devices and/or use structural adhesive can be used for securement of the flanges 52 of the impact absorption devices 14, 16 to the vehicle. In an embodiment, each flange 52 can be formed and attached to the impact absorption device 14, 16, using any number or type of attachment device(s) or method(s). In one embodiment, as shown in FIG. 3, for example, each flange 52 can be secured to the first ends 40 of the impact absorption devices 14, 16 using one or more welds 60. However, the method of attaching flanges 52 to the impact absorption devices 14, 16 is not meant to be limited. For example, other devices and/or methods of attaching the bumper, e.g., welds, friction stir welding, adhesive, mechanical fasteners, etc., are within the scope of this disclosure and can be used without limiting the design, and would be understood by one of ordinary skill in the art. Further, in some embodiments, flanges 52 can be formed integrally with the body portion of the impact absorption devices 14, 16.

Attachment of the devices 14, 16 to the bumper 12 itself can be done in any number of ways or steps. For example, the bumper 12 can undergo bending before inserting each of the at least first and second impact absorption devices 14, 16 into the longitudinally extending channel 32.

Each impact absorption device 14, 16 has portion or section that extends into channel 32 and is connected such that upon impact by an object or other vehicle against the bumper 12, the force against the bumper causes the (collapsible) walls to collapse and/or bend in a predetermined manner.

In an embodiment, the second ends of the at least first and second impact absorption devices 14, 16 are attached to the front vertical wall 22 via one or more welds. For example, a weld can connect each wall of the box shaped body portion of the impact absorption devices 14, 16 to the longitudinally extending extruded aluminum bumper 12.

Welds can be provided in a non-planar manner to connect the impact absorption devices to the bumper. In one embodiment, the upper walls 44 and lower walls 46 of each of the at least first and second impact absorption devices 14, 16 align with and optionally abut an inside surface of the top and bottom walls 18, 20 of the longitudinally extending extruded aluminum bumper 12, as shown in FIG. 3, for example. The second end 42 of the top wall 18 of the longitudinally extending extruded aluminum bumper 12 is connected to the upper walls 44 of each of the at least first and second impact absorption devices 14, 16 via horizontal welds 56 (see FIG. 2), and the second end of the bottom wall 20 of the longitudinally extending extruded aluminum bumper 12 is connected to the lower walls 46 of each of the at least first and second impact absorption devices via horizontal welds 56 (see FIG. 3). Further, front edges of each right side wall 48 and the left side wall 50 of the second ends of each of the at least first and second impact absorption devices 14, 16 optionally abuts an inside surface of the front vertical wall 22 of the longitudinally extending extruded aluminum bumper 12. The front edges are connected to the inside surface of the front vertical wall 22 via vertical welds 58 (see FIG. 2).

In the embodiment shown in FIG. 3, bolts or other attachment devices (not shown) are inserted through openings 54 in the flanges 52 of the impact absorption devices 14, 16 and connected to the end 13 (e.g., frame) of the vehicle.

Figure 4:
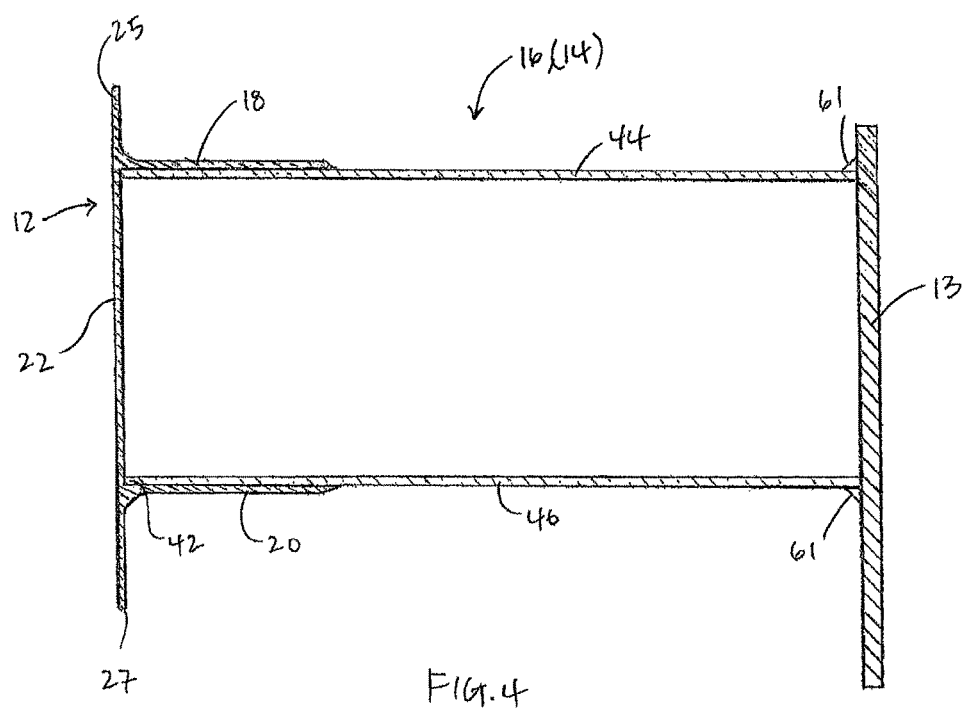
FIG. 4 is a sectional view of parts of the bumper assembly of FIG. 1 taken along line 3-3 and attached to an end of a vehicle in accordance with another embodiment.

In an alternative embodiment, as shown in FIG. 4, for example, the first and second impact absorption device 14, 16 are welded to the end 13 (face, surface, structure, or frame) of the vehicle. In one embodiment, flanges 52 need not be provided on the impact absorption devices 14, 16; rather the first ends 40 can be welded directly to the end 13 of the vehicle.

In another embodiment, welds can be used to connect flanges 52 of the impact absorption devices 14, 16 to the end 13 of the vehicle.

In accordance with an embodiment, it should also be understood that one or more impact absorption devices 14, 16 can be used with and/or replaced by a structure that functions more like a bracket to attach the bumper 12 to a rail or vehicle. Accordingly, use of the impact absorption devices 14, 16 is not intended to limit the design herein in any way, nor the depiction of the bumper assembly 10. Also, it is within the scope of this disclosure to use impact absorption devices within the body of the bumper, e.g., within the longitudinally extending channel 32, without using such devices for attaching the bumper 12 to the vehicle.

Figure 7:
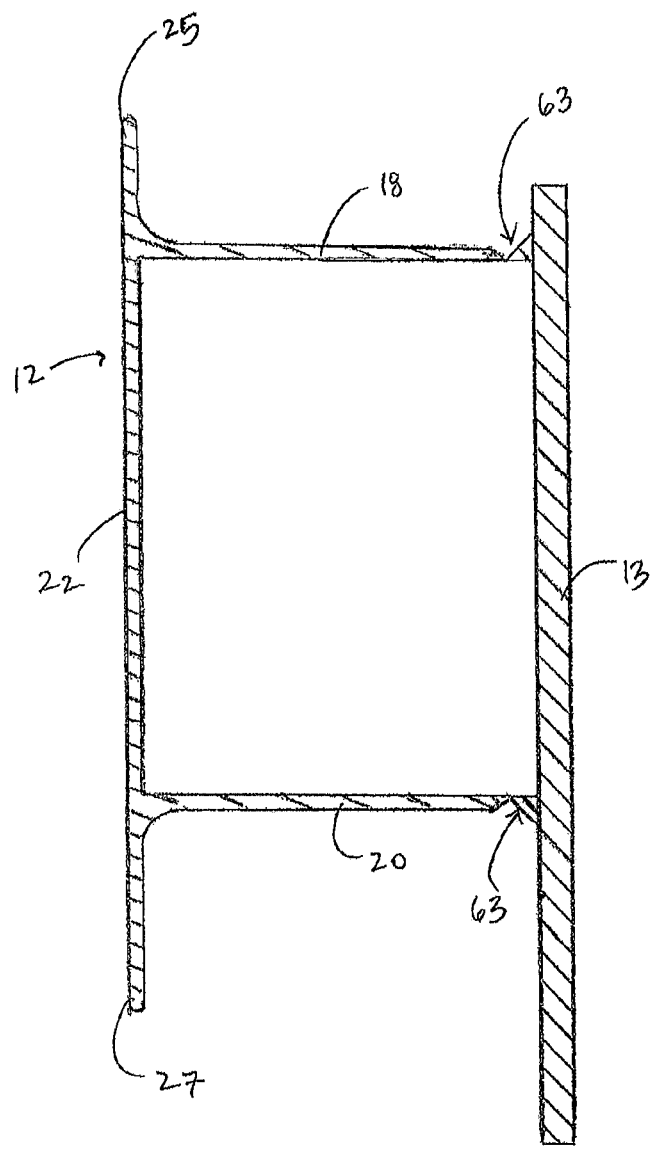
FIG. 7 is a sectional view of the bumper as shown in FIGS. 5 and 6 and as used in the bumper assembly of FIG. 1 taken along line 3-3 and attached to an end of a vehicle in accordance with another embodiment.
Figure 8:
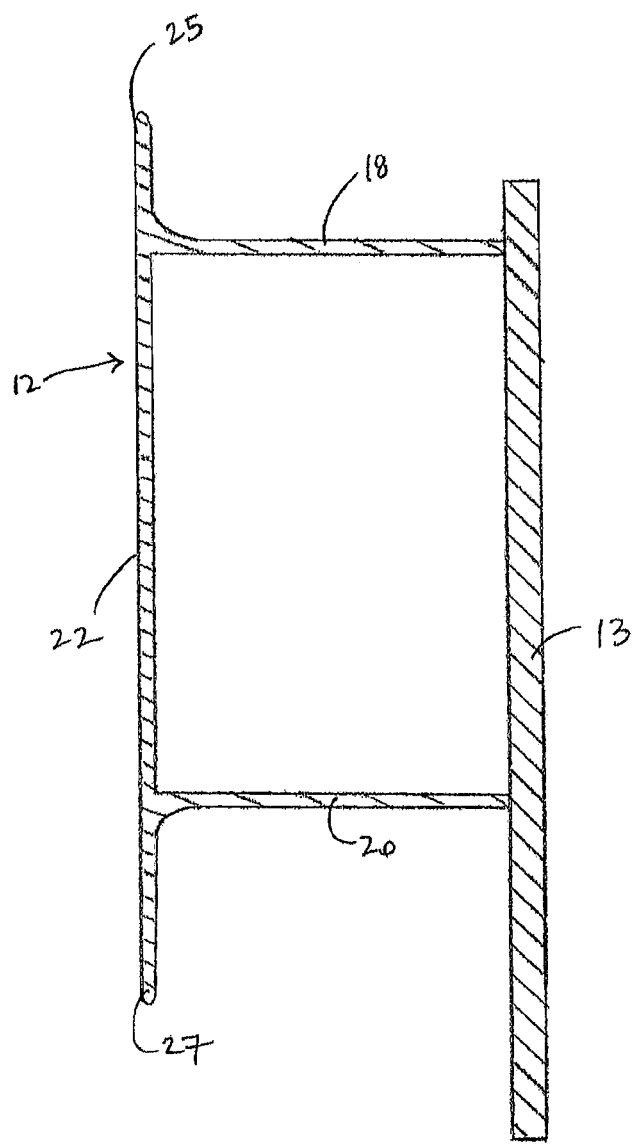
FIG. 8 is a sectional view of the bumper as shown in FIGS. 5 and 6 and as used in the bumper assembly of FIG. 1 taken along line 3-3 and attached to an end of a vehicle in accordance with yet another embodiment.

In some embodiments, the bumper 12 is directly attached to an end 13 of the vehicle. In embodiments, the bumper 12 is directly attached to a portion or a structure of a device or an item on the end 13 of the vehicle, e.g., a face, surface, frame, or rail of a vehicle. For example, the bumper can be directly welded to the end 13 (e.g., a frame, or longitudinal or lateral rail(s)) of the vehicle, as shown in FIG. 7, or bolted to the end 13 of the vehicle, as shown in FIG. 8.

The method or devices used for attachment of the extruded bumper 12 itself, or the bumper assembly 10 (e.g., including the impact absorption devices 14, 16 in its channel 32), to the end 13 of the vehicle is not intended to be limited to the illustrated embodiments, however. Accordingly, one of ordinary skill in the art understands that alternative devices and methods can be used for attachment and/or provided in addition to the devices shown.

In one embodiment, the bumper 12 and/or bumper assembly 10 is mounted to the front end of a frame at the front end of the vehicle. In one embodiment, the bumper 12 and/or bumper assembly 10 is mounted to the back end of a frame at the back end of the vehicle. In another embodiment, the bumper 12 is directly mounted to the front end of a frame at the front end of the vehicle. In another embodiment, the bumper 12 is directly mounted to the back end of a frame at the back end of the vehicle.

The type of aluminum alloy used for forming the herein disclosed bumper 12 is not intended to be limiting. In one embodiment, a 6000 grade or 7000 grade (series) aluminum alloy is used to extrude the bumper 12. Using a 6000 grade or 7000 grade (series) aluminum alloy to form the bumper 12 provides the ability to extrude the herein disclosed bumper design in aluminum, for example.

Figure 9:
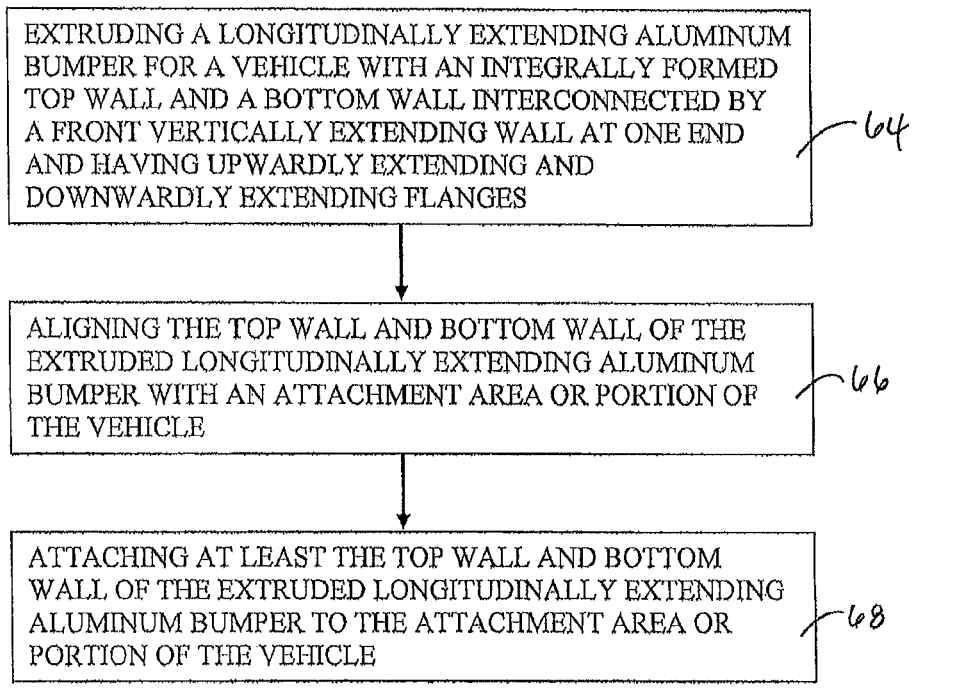
FIG. 9 is a flow chart showing a method of manufacturing the bumper in accordance with an embodiment.
Figure 10:
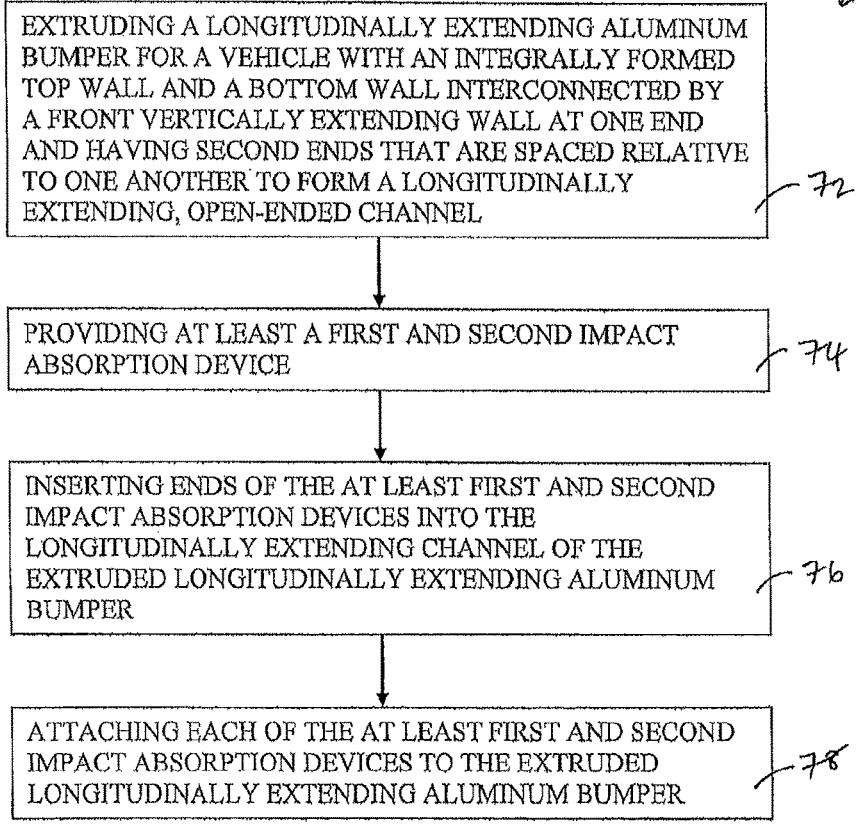
FIG. 10 is a flow chart showing a method of forming the bumper assembly in accordance with an embodiment.

As such, in addition to providing the bumper 12 and/or bumper assembly 10 above, this disclosure further provides a method of forming and a method of manufacturing a bumper and/or a bumper assembly for a vehicle, as shown by the flow charts in FIGS. 9 and 10. For example, as shown in FIG. 9, the method 62 includes, for example, extruding, at 64, a longitudinally extending aluminum bumper 12 constructed to protect the vehicle from impact. As described with reference to the Figures above, the bumper 12 includes an extruded and integrally formed top wall 18 and a bottom wall 20 interconnected at each of their first ends by a front vertically extending wall 22, an integrally formed upwardly extending flange 25 extending vertically from the front vertically extending wall 22 in an upward direction relative to the top wall 18, and an integrally formed downwardly extending flange 27 extending vertically from the front vertically extending wall 22 in a downward direction relative to the bottom wall 20. The top and bottom walls 18, 20 further have second ends that are spaced relative to one another to form a longitudinally extending, open-ended channel 32 between the top and bottom walls, as described above, for example. At 66, the top wall 18 and bottom wall 20 are aligned with an attachment area or portion (i.e., end 13) of the vehicle for attachment thereto. Then, at 68, at least the top wall 18 and bottom wall 20 of the extruded longitudinally extending bumper 12 are attached to the attachment area or portion (i.e., end 13) of the vehicle.

The method 62 can also include bending the extruded longitudinally extending aluminum bumper. In an embodiment, the bending comprises applying pressure to end sections of the longitudinally extending extruded aluminum bumper to move the end sections towards each other.

Once the longitudinally extending extruded aluminum bumper 12 is formed, it can be welded or attached (e.g., via bolts) to the vehicle. In an embodiment, one or more horizontal welds are used to connect the bumper 12 to the end 13 of the vehicle. In an embodiment, the welding of the bumper 12 to the vehicle includes: forming a horizontal weld to connect at least part of the second end of the top wall 18 of the longitudinally extending extruded aluminum bumper 12 to the end of the vehicle, and forming a horizontal weld to connect at least part of the second end of the bottom wall 20 of the longitudinally extending extruded aluminum bumper 12 to the end of the vehicle. In an embodiment, the welding can further include forming one or more vertical welds to connect the bumper 12 to the end of the vehicle. The vertical welds are in a different plane than the one or more horizontal welds.

The method 70 of manufacturing a bumper assembly, such as bumper assembly 10, as shown in FIG. 10 includes, for example, extruding, at 72, a longitudinally extending aluminum bumper 12 constructed to protect the vehicle from impact. As described above with reference to the Figures, the bumper 12 includes an integrally formed top wall 18 and a bottom wall 20 interconnected at each of their first ends by a front vertically extending wall 22, an integrally formed upwardly extending flange 25 extending vertically from the front vertically extending wall 22 in an upward direction relative to the top wall 18, and an integrally formed downwardly extending flange 27 extending vertically from the front vertically extending wall 22 in a downward direction relative to the bottom wall 20. The top and bottom walls 18 and 20 further have second ends that are spaced relative to one another to form a longitudinally extending, open-ended channel 32 between the top and bottom walls, as described above, for example. At 74, at least first and second impact absorption device, such as devices 14 and 16, are provided. Each impact absorption device can have a first end 40 and a second end 42. Then, at 76, the second ends 42 of the at least first and second impact absorption devices 14, 16 are inserted into the longitudinally extending channel 32 of the extruded longitudinally extending aluminum bumper 12. Finally, the method 70 can include attaching each of the at least first and second impact absorption devices 14, 16 to the extruded longitudinally extending aluminum bumper at 78.

In an embodiment, the inserting the second ends 42 of the at least first and second impact absorption devices 14, 16 into the longitudinally extending channel 32 at 76 in method 70 of FIG. 10 includes optionally abutting a front face of the second ends 42 of each of the at least first and second impact absorption devices 14, 16 against the front vertical wall 22 of the longitudinally extending extruded aluminum bumper 12. In an embodiment, the attaching at 78 of each of the first and second impact absorption devices 14, 16 includes attaching second ends of the at least first and second impact absorption devices 14, 16 to the front vertical wall 22 via one or more welds.

As described previously, each of the at least first and second impact absorption devices 14, 16 can have a substantially box shaped body portion comprising an upper wall, a lower wall, a right side wall, and a left side wall. Thus, the inserting of the second ends of the at least first and second impact absorption devices into the longitudinally extending channel at 76 in method 70 of FIG. 10 may include aligning and optionally abutting the upper walls and lower walls of each of the at least first and second impact absorption devices 14, 16 with an inside surface of the top and bottom walls 18, 20 of the longitudinally extending extruded aluminum bumper 12.

The method 70 can also include welding each wall of the impact absorption devices 14, 16 to the longitudinally extending extruded aluminum bumper 12. In an embodiment, the welding of each wall of the impact absorption devices 14, 16 includes: forming a horizontal weld to connect the second end of the top wall 18 of the longitudinally extending extruded aluminum bumper 12 to the upper walls of each of the at least first and second impact absorption devices 14, 16, and forming a horizontal weld to connect the second end of the bottom wall 20 of the longitudinally extending extruded aluminum bumper 12 to the lower walls of each of the at least first and second impact absorption devices 14, 16.

In an embodiment, front edges of each right side wall and left side wall of the second ends of each of the at least first and second impact absorption devices 14, 16 abuts an inside surface of the front vertical wall of the longitudinally extending extruded aluminum bumper 12. Thus, the method 70 can further include forming a vertical weld to connect the front edges of each right side wall and left side wall to the inside surface of the front vertical wall 22 of the bumper 12.

The method 70 can also include bending the body of the extruded longitudinally extending aluminum bumper 12 before inserting each of the at least first and second impact absorption devices 14, 16 into the longitudinally extending channel 32. In an embodiment, the bending comprises applying pressure to end sections of the longitudinally extending extruded aluminum bumper 12 to move the end sections towards each other.

Optionally, in an embodiment, the method 70 can include forming at least a first and second impact absorption device, such as 14 and 16, with each impact absorption device comprising a first end and a second end.

The method of using aluminum and the process of extruding an open-ended or open section bumper design as disclosed herein results in a weight reduced bumper, as well as a reduces costs associated with forming a bumper, e.g., as compared to traditional methods of manufacturing bumpers that utilize sheet forming and/or stamping. Designing an aluminum extruded bumper 12 with an open section reduces mass by eliminating a wall when compared to closed section designs.

The open section of the bumper 12 also has the added benefit of reducing minimum wall thickness requirements when compared to a closed section design. In one embodiment, the wall thickness of the extruded aluminum bumper 12 is less than 2.5 mm. In another embodiment, the wall thickness of the extruded aluminum bumper 12 is less than 2 mm. In yet another embodiment, the wall thickness of the extruded aluminum bumper 12 is less than 1.5 mm. In yet another embodiment, the wall thickness of the extruded aluminum bumper 12 is between 1.0 mm and 2.0 mm.

Therefore, the open section design of the disclosed bumper 12 can be designed with a reduced wall thickness to allow for additional weight savings.

In one embodiment, aluminum is used to form the first and second impact absorption devices 14 and 16. In another embodiment, the at least first and second impact absorption devices 14 and 16 are formed from steel.

Accordingly, the herein disclosed extruded aluminum bumper 12 provides a three-walled, open-end profile for a bumper that is a lightweight, collision or crash support and that is cost effective while still providing strength and energy absorption characteristics for absorbing force from impact, e.g., after collision with an object or other vehicle, and the optional ability to cooperate with impact absorption devices 14 and 16, to manage and to substantially reduce and/or prevent egress into the passenger cab of a vehicle.

The herein disclosed design of the bumper 12 further has positive impact on vehicle performance, weight, and fuel economy.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A bumper for a vehicle comprising:
a longitudinally extending extruded aluminum bumper body constructed to protect the vehicle from impact, the bumper body comprising:
an integrally formed top wall and a bottom wall interconnected at each of their first ends by a front vertically extending wall, the top and bottom walls terminate at associated second ends, the second ends being spaced relative to one another to form a longitudinally extending, open-ended channel defined by the front vertically extending wall, the top wall and the bottom wall, the open-ended channel extending the entire length of the bumper body;
an upwardly extending flange extending vertically from the front vertically extending wall in an upward direction relative to the top wall; and
a downwardly extending flange extending vertically from the front vertically extending wall in a downward direction relative to the bottom wall,
wherein the upwardly extending and downwardly extending flanges are integrally formed with the front vertically extending wall and the top and bottom walls,
wherein the top wall, including both the first end and the second end thereof, is generally disposed in a single plane, and
wherein the bottom wall, including the first end and the second end thereof, is generally disposed in a single plane.

2. A vehicle comprising:
a bumper comprising:
a longitudinally extending extruded aluminum bumper body constructed to protect the vehicle from impact, the bumper body comprising:
an integrally formed top wall and a bottom wall interconnected at each of their first ends by a front vertically extending wall, the top and bottom walls terminate at associated second ends, the second ends being spaced relative to one another to form a longitudinally extending, open-ended channel defined by the front vertically extending wall, the top wall and the bottom wall, the open-ended channel extending the entire length of the bumper body;
an upwardly extending flange extending vertically from the front vertically extending wall in an upward direction relative to the top wall; and
a downwardly extending flange extending vertically from the front vertically extending wall in a downward direction relative to the bottom wall,
wherein the upwardly extending and downwardly extending flanges are integrally formed with the front vertically extending wall and the top and bottom walls,
wherein the top wall, including both the first end and the second end thereof, is generally disposed in a single plane, and
wherein the bottom wall, including the first end and the second end thereof, is generally disposed in a single plane.

3. The vehicle according to claim 2, wherein the bumper is welded to an end of the vehicle.

4. The vehicle according to claim 3, wherein the top wall and bottom wall of the bumper are connected to the end of the vehicle via one or more horizontal welds.

5. The vehicle according to claim 4, wherein the bumper is further connected to the end of the vehicle via one or more vertical welds that are in a different plane than the one or more horizontal welds.

6. The vehicle according to claim 3, wherein the bumper is connected to the end of the vehicle via one or more vertical welds.

7. The vehicle according to claim 6, wherein the bumper is further connected to the end of the vehicle via one or more horizontal welds that are in a different plane than the one or more vertical welds.

8. The vehicle according to claim 2, wherein the top and bottom walls are directly attached to an end of the vehicle.

9. A bumper assembly for a vehicle comprising:
a longitudinally extending extruded aluminum bumper constructed to protect the vehicle from impact, the bumper comprising: an integrally formed top wall and a bottom wall interconnected at each of their first ends by a front vertically extending wall, the top and bottom walls further having second ends that are spaced relative to one another to form a longitudinally extending, open-ended channel defined by the front vertically extending wall, the top wall and the bottom wall, the open-ended channel extending the entire length of the bumper;
an upwardly extending flange extending vertically from the front vertically extending wall in an upward direction relative to the top wall, and a downwardly extending flange extending vertically from the front vertically extending wall in a downward direction relative to the bottom wall; and
at least a first and a second impact absorption device, each of the first and second impact absorption devices having a first end configured to be attached to an end of the vehicle and a second end attached to the longitudinally extending extruded aluminum bumper,
wherein the upwardly extending and downwardly extending flanges of the bumper are integrally formed with the front vertically extending wall and the top and bottom walls, and
wherein the second ends of the at least first and second impact absorption devices are inserted into the longitudinally extending, open-ended channel of the bumper and attached to the front vertical wall of the longitudinally extending extruded aluminum bumper.

10. The bumper assembly according to claim 9, wherein front faces of the second ends of each of the at least first and second impact absorption devices abut the front vertical wall of the longitudinally extending extruded aluminum bumper.

11. The bumper assembly according to claim 9, wherein the second ends of the at least first and second impact absorption devices are attached to the front vertical wall via one or more welds.

12. The bumper assembly according to claim 9, wherein each of the at least first and second impact absorption devices has a substantially box shaped body portion comprising an upper wall, a lower wall, a right side wall, and a left side wall.

13. The bumper assembly according to claim 12, wherein a weld connects each wall of the box shaped body portion of the impact absorption devices to the longitudinally extending extruded aluminum bumper.

14. The bumper assembly according to claim 12, wherein the upper walls and lower walls of each of the at least first and second impact absorption devices align with and abut an inside surface of the top and bottom walls of the longitudinally extending extruded aluminum bumper.

15. The bumper assembly according to claim 14, wherein the second end of the top wall of the longitudinally extending extruded aluminum bumper is connected to the upper walls of each of the at least first and second impact absorption devices via horizontal welds and wherein the second end of the bottom wall of the longitudinally extending extruded aluminum bumper is connected to the lower walls of each of the at least first and second impact absorption devices via horizontal welds.

16. The bumper assembly according to claim 15, wherein front edges of each right side wall and the left side wall of the second ends of each of the at least first and second impact absorption devices abuts an inside surface of the front vertical wall of the longitudinally extending extruded aluminum bumper, and wherein the front edges are connected to the inside surface of the front vertical wall via vertical welds.

17. The bumper assembly according to claim 9, wherein each of the at least first and second impact absorption devices further comprise collapsible walls that abut the top and bottom walls of the bumper and that are configured for collapsing upon application of a predetermined force.

18. The bumper assembly according to claim 9, wherein each of the at least first and second impact absorption devices are hollow.

19. A vehicle comprising:
a bumper assembly comprising:
a longitudinally extending extruded aluminum bumper constructed to protect the vehicle from impact, the bumper comprising:
an integrally formed top wall and a bottom wall interconnected at each of their first ends by a front vertically extending wall, the top and bottom walls further having second ends that are spaced relative to one another to form a longitudinally extending, open-ended channel defined by the front vertically extending wall, the top wall and the bottom wall, the open-ended channel extending the entire length of the bumper;
an upwardly extending flange extending vertically from the front vertically extending wall in an upward direction relative to the top wall, and a downwardly extending flange extending vertically from the front vertically extending wall in a downward direction relative to the bottom wall; and
at least a first and a second impact absorption device, each of the first and second impact absorption devices having a first end configured to be attached to an end of the vehicle and a second end attached to the longitudinally extending extruded aluminum bumper,
wherein the upwardly extending and downwardly extending flanges of the bumper are integrally formed with the front vertically extending wall and the top and bottom walls,
wherein the second ends of the at least first and second impact absorption devices are inserted into the longitudinally extending, open-ended channel of the bumper and attached to the front vertical wall of the longitudinally extending extruded aluminum bumper, and
wherein the first ends of the at least first and second impact absorption devices are mounted to an end of the vehicle.

20. A method of manufacturing a bumper for a vehicle, comprising:

extruding a longitudinally extending aluminum bumper body constructed to protect the vehicle from impact, the bumper body comprising:
an integrally formed top wall and a bottom wall interconnected at each of their first ends by a front vertically extending wall, the top and bottom walls terminate at associated second ends, the second ends being spaced relative to one another to form a longitudinally extending, open-ended channel defined by the front vertically extending wall, the top wall and the bottom wall, the open-ended channel extending the entire length of the bumper body;
an integrally formed upwardly extending flange extending vertically from the front vertically extending wall in an upward direction relative to the top wall; and
an integrally formed downwardly extending flange extending vertically from the front vertically extending wall in a downward direction relative to the bottom wall,
wherein the top wall, including both the first end and the second end thereof, is generally disposed in a single plane, and
wherein the bottom wall, including the first end and the second end thereof, is generally disposed in a single plane.

21. The method according to claim 20, further comprising bending the body of the extruded longitudinally extending aluminum bumper.

22. The method according to claim 21, wherein the bending comprises applying pressure to end sections of the longitudinally extending extruded aluminum bumper body to move the end sections towards each other.

23. A method of forming a bumper assembly for a vehicle, comprising:
extruding a longitudinally extending aluminum bumper constructed to protect the vehicle from impact, the bumper comprising
an integrally formed top wall and a bottom wall interconnected at each of their first ends by a front vertically extending wall, the top and bottom walls further having second ends that are spaced relative to one another to form a longitudinally extending, open-ended channel defined by the front vertically extending wall, the top wall and the bottom wall, the open-ended channel extending the entire length of the bumper;
an upwardly extending flange extending vertically from the front vertically extending wall in an upward direction relative to the top wall, and
a downwardly extending flange extending vertically from the front vertically extending wall in a downward direction relative to the bottom wall, the upwardly extending and downwardly extending flanges of the bumper being integrally formed with the front vertically extending wall and the top and bottom walls;
providing at least a first and second impact absorption device, each impact absorption device comprising a first end and a second end;
inserting the second ends of the at least first and second impact absorption devices into the longitudinally extending, open-ended channel of the extruded longitudinally extending aluminum bumper; and
attaching each of the at least first and second impact absorption devices to the extruded longitudinally extending aluminum bumper.

24. The method according to claim 23, wherein the inserting the second ends of the at least first and second impact absorption devices into the longitudinally extending, open-ended channel comprises abutting a front face of the second ends of each of the at least first and second impact absorption against the front vertical wall of the longitudinally extending extruded aluminum bumper.

25. The method according to claim 23, wherein the attaching each of the first and second impact absorption device comprises attaching second ends of the at least first and second impact absorption devices to the front vertical wall via one or more welds.

26. The method according to claim 23, wherein each of the at least first and second impact absorption devices has a substantially box shaped body portion comprising an upper wall, a lower wall, a right side wall, and a left side wall, and wherein the inserting the second ends of the at least first and second impact absorption devices into the longitudinally extending, open-ended channel comprises aligning and abutting the upper walls and lower walls of each of the at least first and second impact absorption devices with an inside surface of the top and bottom walls of the longitudinally extending extruded aluminum bumper.

27. The method according to claim 26, further comprising welding each wall of the impact absorption devices to the longitudinally extending extruded aluminum bumper.

28. The method according to claim 27, wherein the welding of each wall of the impact absorption devices comprises:
forming a horizontal weld to connect the second end of the top wall of the longitudinally extending extruded aluminum bumper to the upper walls of each of the at least first and second impact absorption devices, and
forming a horizontal weld to connect the second end of the bottom wall of the longitudinally extending extruded aluminum bumper to the lower walls of each of the at least first and second impact absorption devices.

29. The method according to claim 28, wherein front edges of each right side wall and left side wall of the second ends of each of the at least first and second impact absorption devices abuts an inside surface of the front vertical wall of the longitudinally extending extruded aluminum bumper, and
wherein the method further comprises: forming a vertical weld to connect the front edges of each right side wall and left side wall to the inside surface of the front vertical wall.

30. The method according to claim 23, further comprising bending the extruded longitudinally extending aluminum bumper before inserting each of the at least first and second impact absorption devices into the longitudinally extending, open-ended channel.

31. The method according to claim 30, wherein the bending comprises applying pressure to end sections of the longitudinally extending extruded aluminum bumper to move the end sections towards each other.

32. The bumper according to claim 1, wherein the second plane is generally parallel to the first plane.

33. The vehicle according to claim 2, wherein the second plane is generally parallel to the first plane.

34. The method according to claim 20, wherein the second plane is generally parallel to the first plane.

35. The bumper assembly according to claim 9, wherein the top and bottom walls terminate at their associated second ends, wherein the top wall, including both the first end and the second end thereof, is generally disposed in a single plane, and wherein the bottom wall, including the first end and the second end thereof, is generally disposed in a single plane.

36. The bumper assembly according to claim 35, wherein the second plane is generally parallel to the first plane.

37. The vehicle according to claim 19, wherein the top and bottom walls terminate at their associated second ends, wherein the top wall, including both the first end and the second end thereof, is generally disposed in a single plane, and wherein the bottom wall, including the first end and the second end thereof, is generally disposed in a single plane.

38. The vehicle according to claim 37, wherein the second plane is generally parallel to the first plane.

39. The method according to claim 23, wherein the top and bottom walls terminate at their associated second ends, wherein the top wall, including both the first end and the second end thereof, is generally disposed in a single plane, and wherein the bottom wall, including the first end and the second end thereof, is generally disposed in a single plane.

40. The method according to claim 39, wherein the second plane is generally parallel to the first plane.

* * * * *